Sept. 22, 1970    E. V. FRANKENBERG ET AL    3,529,641
TREE SHEAR ASSEMBLY
Filed May 9, 1968                           2 Sheets-Sheet 1

INVENTORS
Edward V. Frankenberg
Norman N. Griffith
BY
George H. Baldwin
ATTORNEY Sept. 22, 1970          E. V. FRANKENBERG ET AL          3,529,641
TREE SHEAR ASSEMBLY
Filed May 9, 1968                                              2 Sheets-Sheet 2
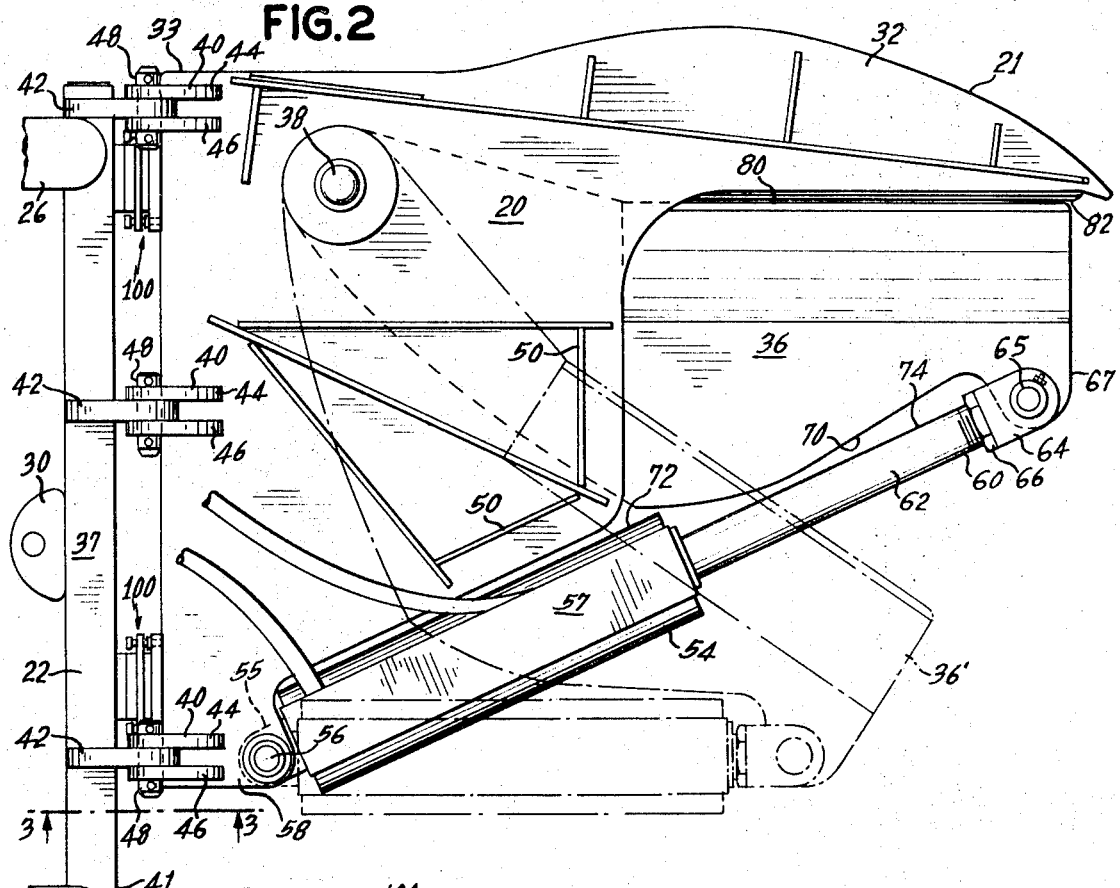
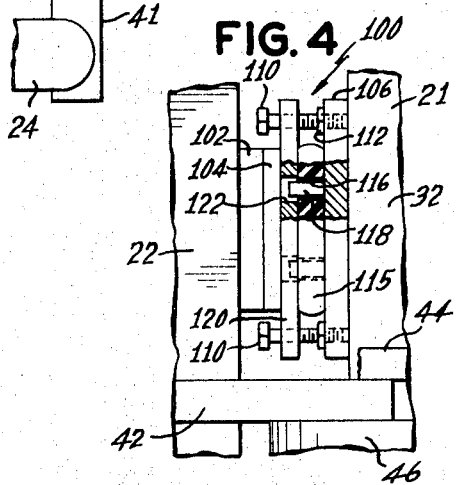
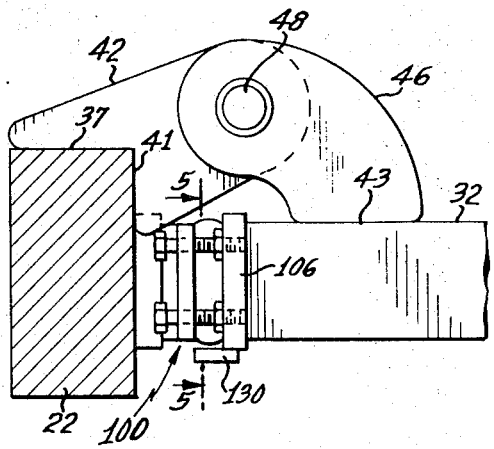
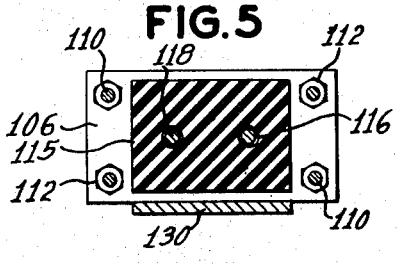
INVENTORS
Edward V. Frankenberg
BY Norman N. Griffith
George H. Baldwin
ATTORNEY

United States Patent Office 3,529,641
Patented Sept. 22, 1970

3,529,641
TREE SHEAR ASSEMBLY
Edward V. Frankenberg and Norman N. Griffith, Jacksonville, Fla., assignors to Fleco Corporation, Jacksonville, Fla., a corporation of Florida
Filed May 9, 1968, Ser. No. 727,853
Int. Cl. A01g 23/02
U.S. Cl. 144—34                                    15 Claims

ABSTRACT OF THE DISCLOSURE

Stop means in the form of a pair of upright plates are respectively attached to the elongated beam and pivotally mounted shear head with the plates contacting each other to limit the head with respect to the beam. The stop means also includes another pair of similarly disposed plates spaced from the first pair of plates. A yieldable rubber member is associated with each pair of plates with one plate of each pair being movably disposed to compress the rubber member against another plate. Specific details as to the manner of attaching the rubber member and the movable plate are set forth herein. The rearward edge of the cutting blade is designed to minimize the space between such edge and the cylinder and piston disposed adjacent thereto for moving the blade during its entire travel between its open and closed positions. The anvil is removably attached to the shear head so that the anvil can be properly shimmed to meet the cutting edge of the blade.

BACKGROUND OF THE INVENTION

Field of the invention

This invention relates to a tree shear assembly and more particularly to an assembly for attachment to a tractor for severing and felling trees and the like.

DESCRIPTION OF THE PRIOR ART

There have been many tree felling devices available on the market and many such devices were patented. Among the various prior art patents relating to tree shear devices are the following: 2,214,334; 2,565,252; 3,196,911; 3,270,-787 and 3,327,745. In some of the prior art devices various components attached to the shear head would permit small trees and brush to become lodged between such components as the tractor and shear head traveled about within the forests. Often these components would become bent or broken requiring repair or replacement before such shear head would again be satisfactorily operable. Also, the large space between the rearward edge of the blade and the operating cylinder and piston (see Pat. Nos. 3,196,911 and 3,327,745) permitted trees, large limbs and stumps to enter such spaces while the blade is in open position and damage would occur to the cylinder and piston when the blade was being closed. Furthermore, some of the prior art devices did not withstand shock loads or impact loads imposed on the shear head during positioning, operation, or movement of the shear head through the forest.

SUMMARY

The tree shear assembly in accord with this invention includes an elongated beam for attachment to a raisable and lowerable member of a tractor with the shear head disposed forwardly of the beam and being pivotally connected thereto. Stop means are provided between the beam and shear head to limit the shear head in its pivotal motion with respect to the beam. The stop means includes a pair of upright plates respectively attached to the upright surface means of each of the beam and shear head and another pair of plates spaced from the first pair of plates. A yieldable member is associated with each pair of plates for absorbing shock and impact loads imposed on the shear head.

One of the plates of each pair is movably mounted on the shear head with the yieldable member disposed between the one plate and another plate rigidly connected to the shear head. A plurality of spaced elongated members extend from the other plate toward and through the one plate for slidably mounting the one plate thereon. A plurality of spaced lugs also extend from the other plate through openings in the yieldable member for mounting same with the one plate having openings aligned with the openings in the yieldable member to permit the lugs to pass into the openings in the one plate when the yieldable member is compressed.

An elongated upright anvil is releasably connected to the frame of the shear head and shim means are removably placed therebetween to close any gap between the anvil and the cuting edge of the blade initially and during wear and re-sharpening of the cutting edge of the blade. The rearward edge of the blade generally opposite to the cutting edge is designed and shaped to minimize the space between such rearward edge and the cylinder and piston disposed adjacent thereto which powers the cutting blade during its entire travel between its open and closed positions.

A general object of this invention is to provide an improved tree shear assembly for felling trees and the like.

A particular object is the provision of a pivotally mounted shear head with spaced stops therefor in its operative position which more adequately distributes the impact forces imposed on the shear head.

Another particular object is to provide an improved shear assembly with yieldable spaced stops which effectively distributes and absorbs the impact forces imposed on the shear assembly.

A specific object of this invention is to provide an improved shear head in which the space between the shear blade and the power means for moving same is minimized to prevent large limbs and the like from becoming lodged therein and damaging the power means.

Another specific object is the provision of an improved anvil for a pivotally mounted shear blade of a shear head which is adjustably supported thereon for closing the gap between the sharpened cutting edge and anvil permitting uniform sharpening of the blade due to wear, chipping or the like.

Other objects of this invention include providing a tree shear assembly rugged and durable in construction, economically manufactured and maintained and easily operable by the driver of the tractor.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 2 is a plan view of the tree shear assembly with the open blade position shown by broken lines;

FIG. 3 is an enlarged cross-sectional view taken along lines 3—3 of FIG. 2;

FIG. 4 is an enlarged plan view of a portion of the assembly of FIG. 2 with parts broken away for clarity;

FIG. 5 is a cross-sectional view taken along lines 5—5 of FIG. 3;

DESCRIPTION OF THE PREFERRED EMBODIMENT

Figure 1:
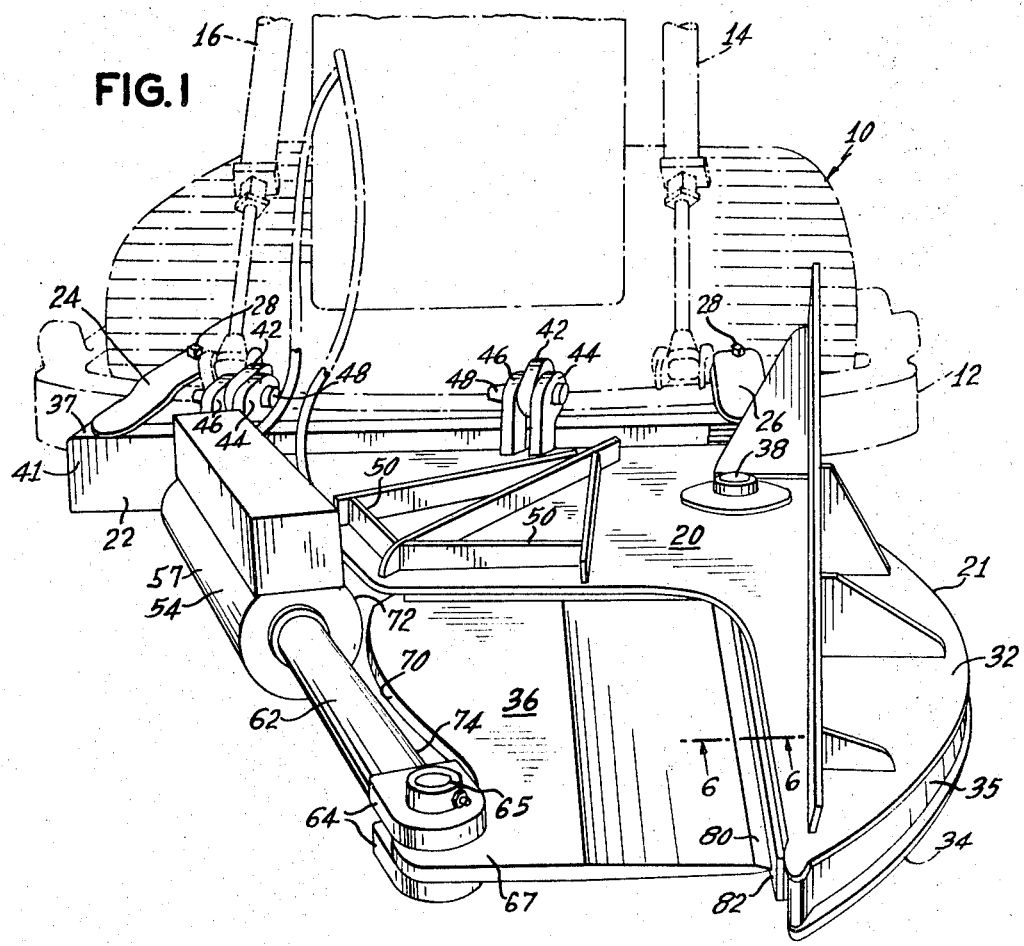
FIG. 1 is a front perspective view of the tree shear assembly in accord with the invention mounted on the front end of a tractor, the tractor being shown by broken lines.
Figure 6:
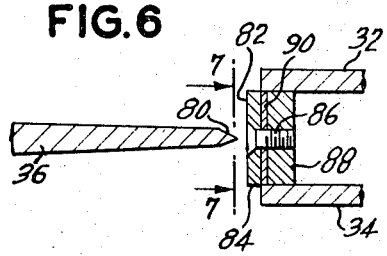
FIG. 6 is an enlarged cross-sectional view taken along line 6—6 of FIG. 1.
Figure 7:
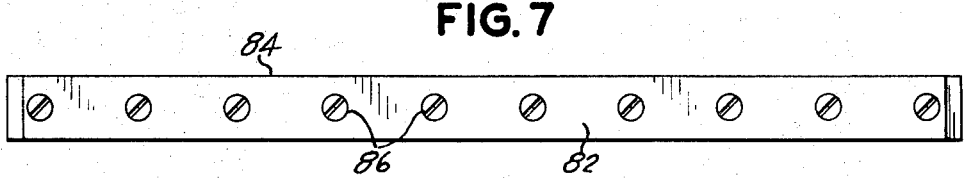
FIG. 7 is an elevational view taken along line 7—7 of FIG. 6.

Referring now to the drawings and particularly FIG. 1, the conventional tractor is designated by broken lines 10 which includes a framing member in the form of a standard C-frame 12 raisable and lowerable by a pair of oppositely disposed hydraulic cylinder assemblies 14 and 16 connected to and positioned on respective opposite sides of the tractor 10 in a manner well known in the art.

The shear assembly 20, in accord with the invention, includes an elongated beam or member 22 extending generally forwardly of and along tractor 10, and member 22 is connected to C-frame 12 by two rearwardly extending pairs of arms, including arms 24 and 26, welded to member 22, which extend above and below frame 12 with bolt connections 28 securing rearward arm ends of respective pairs of arms together. A pair of spaced ears, including ear 30, are welded to and extend rearwardly of member 22 for releasable connection to a portion (not shown) of C-frame 12 generally medially thereof, ear 30 only being shown in FIG. 2.

A pair of generally parallel and spaced plates 32 and 34, with blade 36 positioned therebetween, are disposed forwardly of member 22. Plates 32 and 34 are maintained in proper spaced position by a plurality of spacers, including spacer 35, welded therebetween. A pivotal connection 38 mounts blade 36 between plates 32 and 34 for restricted pivotal motion between its fully closed position and its fully open position 36'. Pivotal connections 40 are spaced along member 22 and connect member 22 with the rearward end portion 33 of the upper plate 32. Each connection 40 includes an upwardly extending ear 42 welded to the upper horizontal surface means 37 and upright surface means 41 of member 22 and a pair of upwardly extending and spaced ears 44 and 46 welded to the upper surface means 43 of plate 32 with a pin means 48 connecting adjacent upper ends of ears 42, 44 and 46.

The blade 36 rides between plates 32 and 34 on suitable bearing members (not shown) disposed generally along and beneath plate reinforcing members 50, such bearing members being disposed on the inward surfaces of plates 32 and 34 and generally oppositely facing each other. Power means in the form of a hydraulic cylinder and piston 54 at its rearward end 55 is positioned between a portion 58 of each of plates 32 and 34 and a vertical pivot pin 56 connects end 55 thereto. As seen in FIG. 2, pin 56 is disposed generally opposite to the pivotal connection 38 of blade 36 and permits cylinder 57 to pivot about pin 56 as cylinder 57 moves blade 36 between its open and closed positions. The forward end 60 of piston rod 62 is internally threaded and an externally threaded portion (not shown) of clevis 64 is connected therewithin, a lock nut 66 being provided about the clevis externally threaded portion to partially adjust and releasably fix the limit of the blade travel with respect to the anvil 82. The clevis 64 is connected by a vertical pivot pin 65 to the forward portion 67 of blade 36.

The blade 36 in accord with this invention is preferably designed to have a rear edge portion, that edge portion 70 generally opposite to cutting edge 80 and exposed from between plates 32 and 34, so that during the blade travel, from the fully open broken line position 36' in FIG. 2 to its fully closed full line position shown in FIGS. 1 and 2, the rear edge portion 70 will barely be out of contact with the inwardly disposed edge 72 of cylinder 57 and/or edge 74 of piston rod 62. The spacing between the rod edge 74 and cylinder edge 72 and the blade rear edge 70 is minimized throughout the movement of the blade 36 so that limbs and/or brush or the like of limited size only can work into or fall into such spacing. Any large limbs or brush are inhibited from entry into such spacing thereby affording protection to the cylinder 54 and rod 62 and minimizing damage thereto otherwise resulting when larger limbs or the like are caught in such spacing. In other words, if the spacing were not minimized, large limbs could become lodged in such spacing, and when cylinder 54 was activated, rod 62 may be bent or broken and/or other damage could be caused to the cylinder 54 or other components. Also, such large limbs would probably prevent the full travel of the blade cutting edge 80 from cutting through the tree trunk disposed between cutting edge 80 and anvil 82.

The anvil 82 in accord with another aspect of the invention comprises an elongated bar 84 removably connected by spaced fasteners in the form of screws 86 to an upright frame member 88 welded to and between plates 32 and 34. A shim 90 is located between bar 84 and member 88 which may be removed and replaced by a thicker and/or wedged shaped shim when the blade edge 80 is sharpened after wear thereof. Also, the entire blade edge 80 need not require sharpening thus permitting partial shims to be placed between bar 84 and member 88 to compensate for the sharpening of only a portion of the blade edge 80. In this connection, the blade edge 80 will be normally sharpened along a generally straight line so that after proper shimming of the anvil bar 84, the bar 84 will meet the sharpened edge 80 of the blade 36. Preferably, the blade is sharpened uniformly requiring a uniform thicker shim to close the gap between blade edge 80 and anvil 82. The adjustable clevis 64 and rod 62 also may be used to partially close the gap between blade 36 and the anvil 82 after sharpening of the blade, but the adjustment in this manner may require more of the blade to be ground adjacent the heel of the anvil, thus requiring a greater degree of skill and care in sharpening the blade.

According to the invention yieldable stop means 100 are provided between framing member 22 and the ends of plates 32 and 34 beneath the horizontal pivotal axis for the shear head 21 of assembly 20, such axis being provided by aligned pin means 48 in each pivotal connection 40 whereby shear head 21 may be lifted from its generally horizontal, tree cutting, operative position shown in FIGS. 1 and 2 to a generally vertical, traveling, and inoperative position (not shown). The shear head 21 may be raised and lowered by a common cable and winch normally provided on the tractor 10.

The shear head assembly, as shown in the drawings, is either in cutting position on a downward slope or out of contact with the ground. When in use the shear head 21 may assume a tree cutting position which is horizontal with the tractor similarly being horizontal, or which is inclined upwardly or downwardly with respect to the horizontal. In other words, the tree shear assembly can be used for cutting trees on flat land, rolling terrain and on the slopes of hills over which a tractor can be adequately maneuvered. In the normal tree cutting positions the stop means are not in operative contact unless the shear head is out of engagement with the ground or the shear head is positioned on a downward slope with respect to the tractor.

The components of the yieldable stop means 100 may best be understood by reference to FIGS 3, 4 and 5 in which a pair of generally rectangular plates 102 and 104 are suitably welded together and to the upright surface means 41 of member 22. Oppositely facing plates 102 and 104 is a generally rectangular plate 106 welded to each of the end edges of parallel plates 32 and 34, such end edges forming an upright surface means opposite to and generally parallel with the upright surface means 41 of member 22. A plurality of threaded bolts 110 and adjustably connected to plate 106 and extend rearwardly toward tractor 10 and plates 102 and 104. A lock nut 112 is threaded onto each bolt 110 for adjustably affixing the rearward extent of bolt 110. Juxtaposed with respect to plate 106, opposite to its connection with the ends of parallel plates 32 and 34, is a yieldable and resilient rectangular member 115 made of rubber or the like, member 115 being maintained in juxtaposition by rearwardly extending lugs 118 attached to plate 106 and passing through a pair of spaced openings 116 in member 115. A plate 120 is slidingly disposed on bolts 110 and is juxtaposed with respect to member 115 opposite to plate 106. Plate 120 includes a pair of openings 122 therethrough aligned with lugs 118, so that when member 115 is substantially compressed between plates 106 and 120, the lugs 118 may move into openings 122 as shown in FIG. 4. Lugs 118 function to retain member 115 properly disposed between plates 106 and 120 when there is a lack of any compressive force, as when the shear head 21 is in its upstanding traveling position. Affixing member 115 to plate 106 by gluing or the like is undesirable since the forces imposed on member 115 would have a tendency to tear and/or otherwise become damaged and would not be readily replaceable. A flat bar 130 is welded to plate 106 and extends rearwardly beneath rubber member 115 to protect same from brush or other obstructions which may damage same during use of the tree shear or during travel of the shear head in an upstanding manner.

While only a certain preferred embodiment of this invention has been shown and described by way of illustration, many modifications will occur to those skilled in the art and it is intended that all such modifications be included within the true spirit and scope of this invention.

What is claimed as new and what it is desired to secure by Letters Patent of the United States is:

1. In a tree shear assembly for attachment to a tractor comprising an elongated beam extending laterally of the tractor and adapted for attachment to a raisable and lowerable framing member of the tractor, a shear head disposed forwardly of said beam, means for pivotally connecting said shear head to said beam and forming a pivot axis extending parallel to said beam for pivoting of said shear head thereabout, stop means interposed between said beam and shear head for limiting the pivoting motion therebetween, said stop means including a pair of upright plates respectively attached to said beam and shear head, said pair of plates being oppositely disposed and contacting each other when said shear head is in a generally horizontal position.

2. In the tree shear as defined in claim 1 wherein said beam includes a generally upright surface means, said shear head includes an upright surface means in generally aligned spaced relation to said beam surface means when said shear head is in its said horizontal position, said upright plates being respectively attached to said upright surface means of said beam and shear head.

3. In the tree shear as defined in claim 2 wherein said stop means further includes another plate attached to one said upright surface means, a yieldable member disposed between one said upright plate and said other plate, said one upright plate being movably disposed with respect to said other plate whereby said yieldable membeer is compressed when said pair of plates contact each other and said shear head is in said horizontal position.

4. In the tree shear as defined in claim 1 wherein said stop means includes another pair of upright plates respectively attached to said beam and shear head, said other pair of plates being spaced from said pair of plates and being oppositely disposed for contacting each other when said shear head is in said horizontal position.

5. In the tree shear as defined in claim 1 wherein said pivotal connecting means includes a plurality of upstanding ears mounted spacedly along said beam and extending toward said shear head, a plurality of upstanding ears mounted spacedly along said shear head and extending toward said beam, pin means connecting said ears of said beam to said ears of said shear head and forming said pivot axis generally spacedly above said stop means.

6. In a tree shear assembly for attachment to a tractor comprising an elongated beam extending laterally of the tractor and adapted for attachment to a raisable and lowerable framing member of the tractor, a shear head disposed forwardly of said beam and having a generally upright surface means and a generally horizontal surface means, said beam including a generally upright surface means in approximately aligned spaced relation to said shear head upright surface means and a horizontal surface means, pivotal connecting means attached to said horizontal surface means of each said beam and shear head for pivotally connecting said shear head to said beam and forming a pivot axis extending parallel to said beam for pivoting of said shear head thereabout, yieldable stop means interposed between said beam and shear head upright surface means for limiting the pivoting motion therebetween thereby stopping said shear head to dispose same generally in a horizontal plane parallel to the ground, said shear head being pivotal between said horizontal plane and a generally upright plane.

7. In the tree shear as defined in claim 6 wherein said yieldable stop means including a first upright plate mounted to one of said upright surface means, a second upright plate mounted to the other of said upright surface means, a third upright plate movably disposed with respect to said second plate, a yieldable member disposed between said second and third plates, said first plate contacting said third plate to compress said yieldable member between said third and second plates when said shear head is in its operative said horizontal plane.

8. In the tree shear as defined in claim 7 wherein said one upright surface means is said beam surface means and said other upright surface means is said shear head surface means.

9. In the tree shear as defined in claim 7 further comprising a plurality of spaced and elongated members attached to said second plate and extending toward said first plate, said third plate having a plurality of openings therethrough into which each said elongated member extends thereby slidingly mounting said third plate on said elongated members, said elongated members terminating in free ends and disposed outwardly and out of contact with said first plate whereby said first plate only contacts said third plate when said shear head is in said horizontal plane.

10. In the tree shear as defined in claim 9 further comprising a plurality of spaced and elongated lugs attached to said second plate and extending toward said first plate, said yieldable member having a plurality of openings therethrough into which each said lug extends, said yieldable member being maintained between said second and third plates by said lugs.

11. In the tree shear as defined in claim 10 wherein said third plate includes another plurality of openings generally aligned with respective said openings in said yieldable member, said lugs extending into respective said other openings in said third plate when said yieldable member is under substantial compression between said second and third plates.

12. In the tree shear as defined in claim 11 further comprising a protective means connected to said second plate beneath said yieldable member and third plate and extending toward said third plate, said protective means providing protection for said yieldable member from inadvertent damage and dislodgement of said yieldable member from its attachment to said lugs.

13. In the tree shear as defined in claim 7 wherein said yieldable stop means includes another first upright plate mounted to said one upright surface means and spaced from said first plate, another second upright plate mounted to said other upright surface means and spaced from said second plate, another third upright plate movably disposed with respect to said other second plate, another yieldable member disposed between said other second and third plates, said other first plate contacting said other third plate to compress said other yieldable member between said other third and second plates when said shear head is in said horizontal plane.

14. In the tree shear as defined in claim 6 wherein said pivotal connecting means includes a plurality of upstanding ears mounted spacedly along said beam horizontal surface means and extending toward said shear head, a plurality of upstanding ears mounted spacedly along said shear head horizontal surface means and extending toward said beam, pin means connecting said ears of said beam to said ears of said shear head and forming said pivot axis generally spacedly above said stop means.

15. In a tree shear assembly for attachment to a tractor comprising an elongated beam extending laterally of the tractor and adapted for attachment to a raisable and lowerable framing member of the tractor, a shear head disposed forwardly of said beam, means for pivotally connecting said shear head to said beam and forming a pivot axis extending parallel to said beam for pivoting of said shear head thereabout, stop means interposed between said beam and shear head spaced generally below said pivot axis for limiting the pivoting motion therebetween, said stop means limiting said shear head to dispose same in a generally horizontal position, said shear head including a cutting blade having a cutting edge and an anvil, said blade being swingable between an open position and a closed position with said cutting edge closely adjacent said anvil, said shear head including a frame, releasable means for adjustably securing said anvil to said shear head frame whereby the spacing between said cutting edge and anvil is adjustable, a hydraulic cylinder and piston pivotally connected between said frame adjacent said stop means and adjacent said cutting blade forwardly toward the outer end thereof, said cutting blade having a rearward edge opposite to said cutting edge which is adjacent to and spaced from said cylinder and piston, said rearward edge having a predetermined configuration whereby the spacing between said rearward edge and cylinder and piston is minimized during the extension and retraction of said piston within said cylinder which moves said cutting blade from its operative cutting position with its said cutting edge closely adjacent said anvil to its open inoperative position.

References Cited

UNITED STATES PATENTS

| | | | |
|---|---|---|---|
| 1,447,543 | 3/1923 | Gessman | 143—43 |
| 2,876,816 | 3/1959 | Busch et al. | 144—309 |
| 3,059,677 | 10/1962 | Busch et al. | 144—309 |
| 3,270,787 | 9/1966 | Rehnstrom | 144—34 |
| 3,327,745 | 6/1967 | Meece et al. | 144—34 |

GERALD A. DOST, Primary Examiner